Nov. 11, 1958  A. W. COOK  2,859,521
APPARATUS FOR MAKING STEREOSCOPIC DRAWINGS
Filed Aug. 12, 1953  3 Sheets-Sheet 1
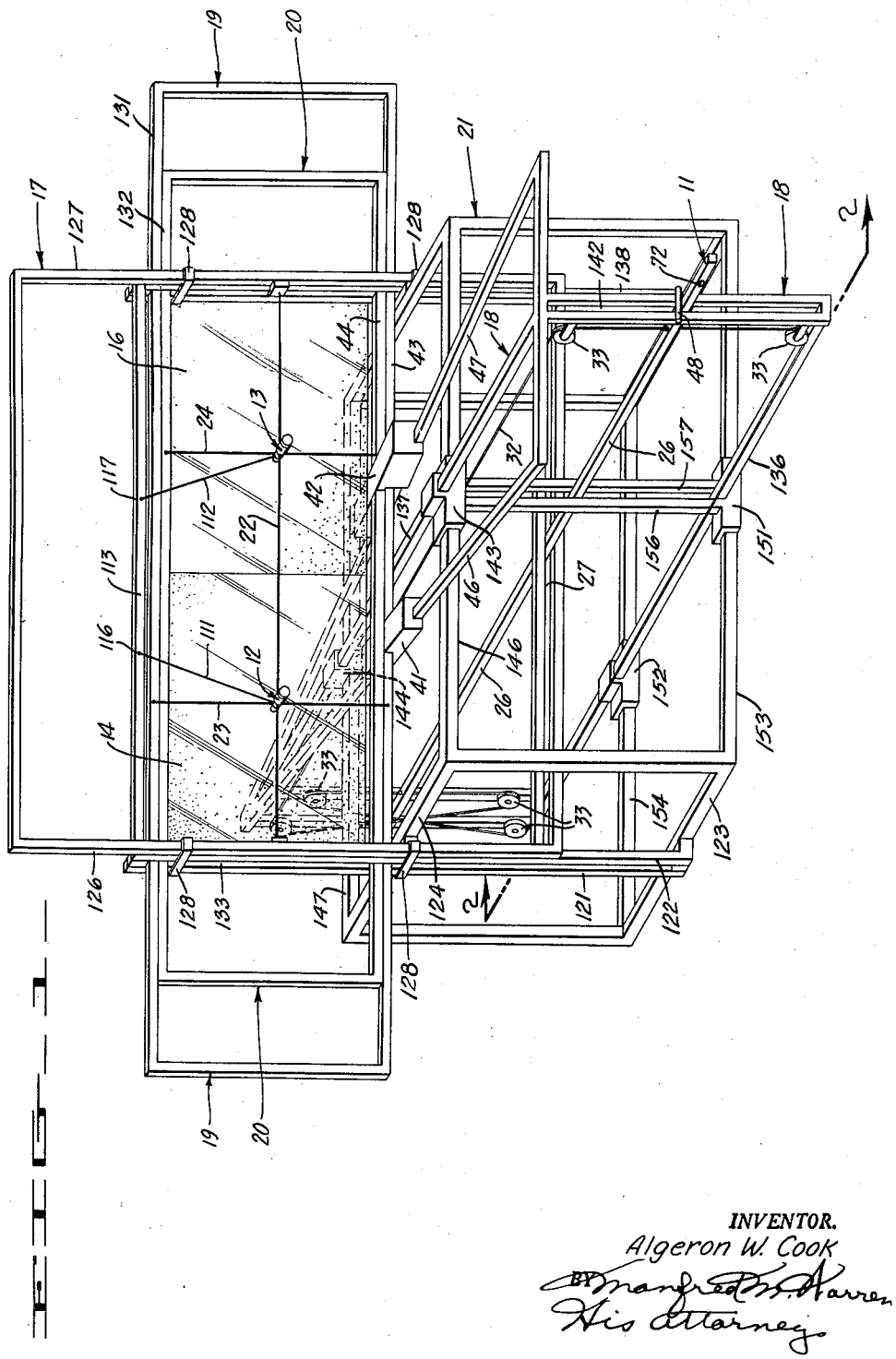
INVENTOR.
Algeron W. Cook
BY Manfred M. Warren
His Attorney

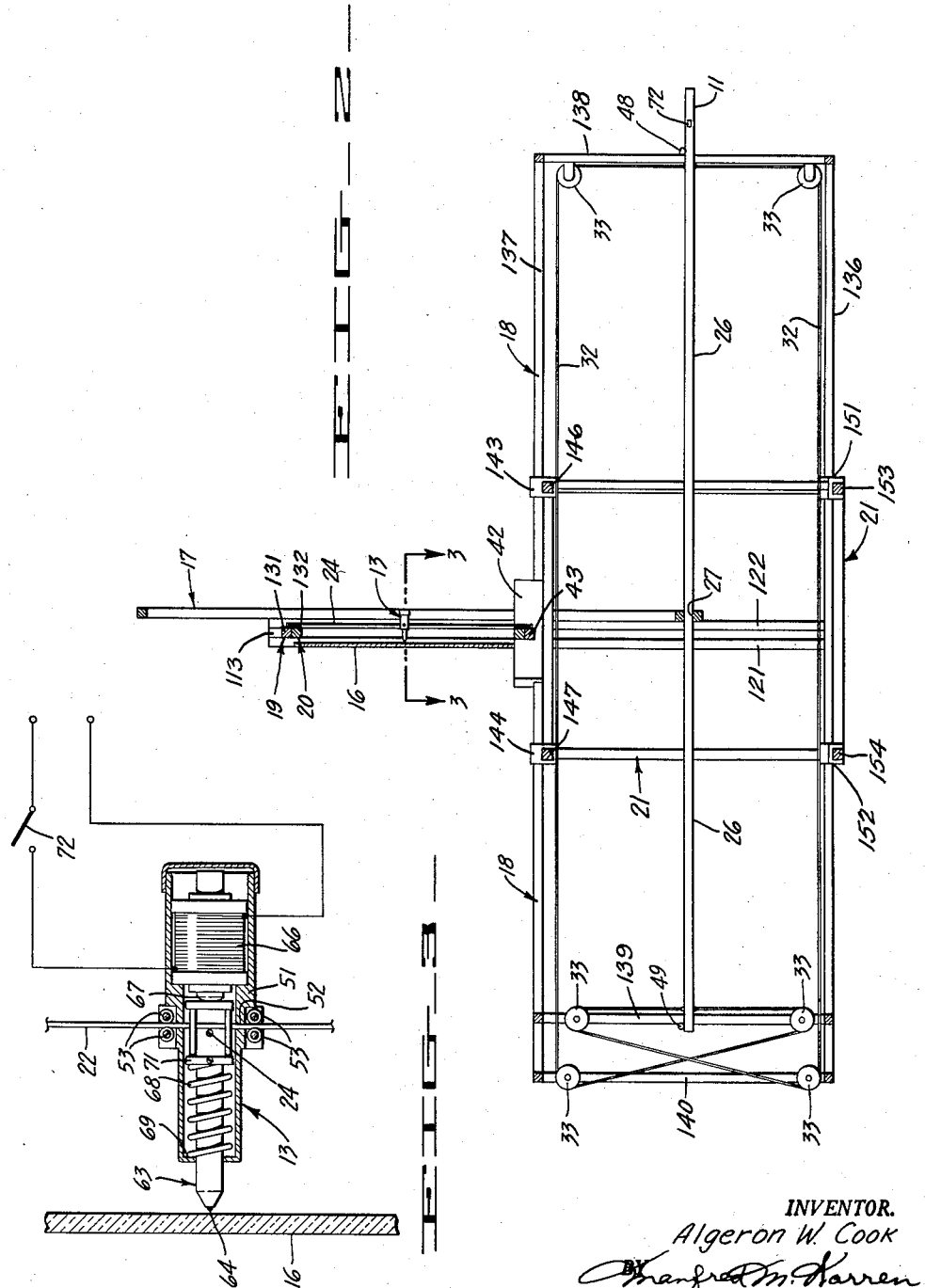

Nov. 11, 1958  A. W. COOK  2,859,521
APPARATUS FOR MAKING STEREOSCOPIC DRAWINGS
Filed Aug. 12, 1953  3 Sheets-Sheet 3

INVENTOR.
Algeron W. Cook
BY
His Attorney

United States Patent Office 2,859,521
Patented Nov. 11, 1958

2,859,521

APPARATUS FOR MAKING STEREOSCOPIC DRAWINGS

Algeron W. Cook, Oakland, Calif.

Application August 12, 1953, Serial No. 373,932

8 Claims. (Cl. 33—20)

The invention relates to drawing instruments and apparatus designed for making, copying, or reproducing drawings and other objects.

An object of the present invention is to provide a method and apparatus of the character described having a manually held element movable in all directions and through all three dimensions of length, width and depth and with which an artist may compose an object or scene in three dimensions and wherein the apparatus will automatically translate the movements of this element into a pair of drawings which are capable, when viewed stereoscopically, of producing an illusion in depth of the solid object or scene depicted.

Another object of the present invention is to provide a method and apparatus of the character described in which the user may stereoscopically view the separate drawings as they are being delineated so as to aid the person using the apparatus in visualizing and composing in depth.

The invention possesses other objects and features of advantage, some of which, with the foregoing, will be set forth in the following description of the preferred form of the invention which is illustrated in the drawings accompanying and forming part of the specification. It is understood, however, that variations in the showing made by said drawing and description may be adopted within the scope of the invention as set forth in the claims.

Referring to said drawings:

Figure 1 is a perspective view of an apparatus for making stereoscopic drawings constructed in accordance with the present invention.

Figure 2 is a cross-sectional view of the apparatus taken substantially on the plane of line 2—2 of Figure 1.

Figure 3 is a cross-sectional view on an enlarged scale of a portion of the apparatus taken substantially on the plane of line 3—3 of Figure 2.

Figure 4:
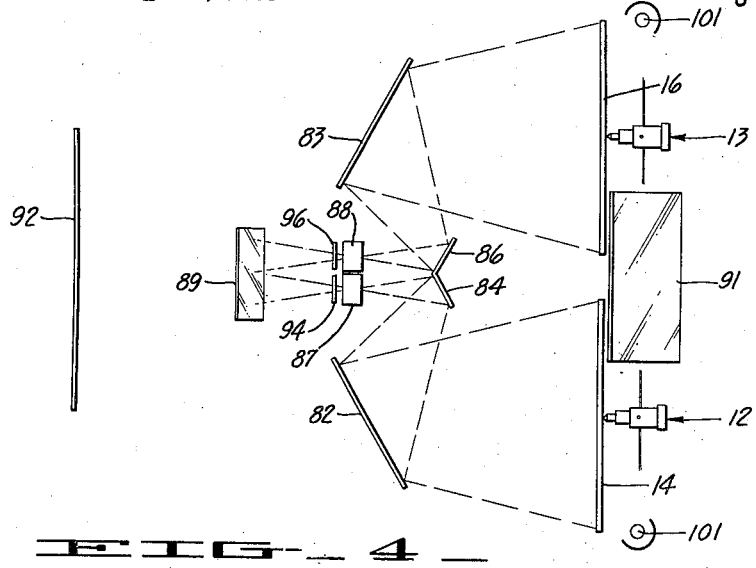
Figure 4 is a diagramatic plan view of an optical system associated with the apparatus of the present invention.

The present invention contemplates the production of a pair of drawings which, when viewed stereoscopically, will provide an illusion of depth or a third dimension. The apparatus and method for carrying this out in accordance with the present invention consists, broadly stated, in the provision of a manually engageable member 11 mounted for movement in any direction horizontally, vertically, and depthwise as in composing a three dimensional object or scene, and a pair of writing members 12 and 13 mounted for movement over and marking upon a pair of drawing surfaces 14 and 16, together with means connecting the member 11 to the writing members 12 and 13 for transmitting the horizontal and vertical components of movement of the member 11 into proportional and joint horizontal and vertical movement of the writing members. Also included in the apparatus is means connecting the member 11 to the writing members 12 and 13 for transmitting the depthwise component of movement of the member 11 into proportional horizontal movement of the writing members relative to each other with the writing members approaching each other in the depthwise movement of the member 11 toward the user and separating from each other in a movement of the member 11 away from the user.

The apparatus may be constructed to orient the separate drawing surfaces 14 and 16 in any desired position relative to each other and to the handle 11. The terms "horizontal" and "vertical," as used herein, refer to the side and up and down dimensions of the drawing as oriented for stereoscopic viewing and hence refer also to the side to side and up and down movements of the handle 11 relative to the user manipulating the handle. In the same manner the term "depthwise" refers to the apparent depth of the portion of the object being drawn within the stereoscopically viewed pictures and hence the relative positioning of the member 11 toward and away from the user.

Motion transmitted, as above described, from the manually held member 11 to the writing members 12 and 13 will result, when the artist or user displaces the manual member 11 through a three dimensional pattern, in the automatic inscribing by the writing members 12 and 13 of stereoscopic views of the pattern on the drawing surfaces 14 and 16 which, when viewed stereoscopically, will provide an illusion of depth. Various means and devices may be employed for obtaining transmission and translating of movement from the member 11 to the writing members 12 and 13. In the form of the apparatus here shown, mechanical means is used which includes a plurality of interconnected and interacting rectangular sliding subframe elements 17, 18, 19 and 20 unitarily associated with and carried upon a suitable stationary main framework 21, here depicted, for clarity of illustration, as of simple open-sided, rectangular box-like form. A pair of horizontally spaced upright standards 121 and 122 are secured to the lower and upper frame sides 123 and 124 at the opposite ends of the frame work and project upwardly therefrom and are connected at their upper ends with a cross-bar 113. The drawing surfaces 14 and 16 are here supported on the upright standards 121 and 122 in side by side relation in a common vertical plant and the writing members 12 and 13 are supported for movement thereover at the shifting intersections of a horizontal wire 22 with a pair of vertical cross wires 23 and 24 with the wires being fixed to the opposite sides of and extending across the subframes 17, 19 and 20 respectively in an arrangement whereby the writing members will be propelled horizontally and vertically in precise conformity with the shitfing points of intersection of the cross wires as the sliding elements 17, 19 and 20 are moved jointly and relatively to each other. As will be observed from Figure 1, horizontal wire 22 is secured at its opposite ends to the opposite vertical sides 126 and 127 of frame 17 substantially centrally of the height of such sides, and this frame is supported and guided for vertical movement by brackets 128 carried by the upright standards 121 and 122 at the opposite ends of the frame 21. Accordingly vertical movement of frame 17 with respect to frame 21 will cause a corresponding vertical movement of cross-wire 22.

The aforementioned means for effecting joint and proportional vertical movement of the writing members 12 and 13 over their respective drawing surfaces 14 and 16 is here afforded by a horizontally extending bar 26, providing the handle 11 at one end, connected to the subframe 17 for transmitting the up and down movements of the handle through the subframe 17 and attached wire 22 to the writing instruments 12 and 13. As here shown, the bar 26 is supported for vertical movement by the subframe 18 which is positioned perpendicular to the vertically movable subframe 17, see Figures 1 and 2. The bar 26 is held substantially horizontal during its up and down movements by means of a cable 32 secured to the bar adjacent its opposite ends and entrained around a series of pulleys 33 in the manner best shown in Figure 2, the bar 26 being slidably engaged through a horizontally extending slot 27 formed in the lower portion of the subframe 17. In this manner upward and downward movements of the handle 11 will serve to move the bar 26 and engaged subframe 17 upwardly and downwardly therewith and, by reason of the connection of the subframe 17 and wire 22 to the writing members 12 and 13, such upward and downward movements will result in a corresponding upward and downward movement of the writing members constantly proportional to, and in the same direction as, the vertical component of the movements of the handle 11. The proportion in the present apparatus is one to one.

The means for translating the horizontal side-to-side movements of the handle 11 to effect a joint and proportional horizontal movement of the writing members 12 and 13 across their respective drawing surfaces is here provided by connecting the subframe 18, which is mounted for side-to-side sliding movement on the main frame 21, to the subframes 19 and 20, supporting the vertical wires 23 and 24, in a manner providing joint horizontal movement of the wires 23 and 24 and their associated writing members in the same direction as the horizontal movements of the handle 11.

As here shown, frames 19 and 20 are here of rectangular internesting form, with the upper and lower side rails 131 and 43 of frame 19 arranged on the outside of and for slidably supporting, for relative longitudinal reciprocation, the upper and lower rails 132 and 44 of frame 20. The two frames thus internested for relative movement are slidably mounted for transverse (side to side) reciprocation in guide slots 133 provided between the upright standards 121 and 122. The vertical wires 23 and 24 are secured at their opposite ends to the vertically spaced longitudinal rails of the frames 19 and 20 medially of their length, with wire 23 secured to rails 131 and 43, and wire 24 secured to rails 132 and 44. Accordingly, relative movement between the frames 19 and 20 will be accompanied by relative movement between wires 23 and 24 and corresponding relative movement between the writing members 12 and 13.

The side to side movement of frames 19 and 20 is here controlled by the side to side and in and out movement of subframe 18. As here shown, frame 18 is of rectangular form, having a base rail 136, a top rail 137, a vertical front end 138 and a pair of horizontally spaced vertical rear end members 139 and 140. The pulleys 33 are carried by these upright ends (see Figure 2). It will also be observed from Figures 1 and 2 that the front end 138 and rear end 139 are formed with vertical guide slots 142 for receiving the opposite ends of the bar 26 so that the handle 11 is guided for vertical movement relative to frame 18 while being restrained against relative side to side motion.

Side to side and in and out motion of frame 18 with respect to the main frame 21 is here controlled by bearing members 143 and 144 which are slidably mounted on the top rails 146 and 147 of the frame 21 at the front and rear of the frame, and which are, in turn, formed with right-angularly arranged openings for slidably receiving the top rail 137 of frame 18. In a similar manner, bearing members 151 and 152 are slidably mounted on the bottom rails 153 and 154 of the frame 21 and are provided with right-angularly arranged openings for slidably receiving the bottom rail 136 of frame 18. Preferably, bearing members 143 and 151 are connected for joint movement by an upright member 156 which is formed with a vertical slot 157 for receiving bar 26 therethrough. Accordingly it will be seen that side to side movement of handle 11 will be accompanied by a side to side movement of frame 18 while the latter is maintained in a vertical plane. It will also be noted that in all side to side positions of frame 18, the latter may be freely moved to and from frame 21 by reason of the sliding connections provided by the several bearings. To effect in and out motion of frame 18, bar 26 is provided with cross-members 48 and 49 which bear against the outer faces of the upright sides 138 and 139 of frame 18 so that regardless of the relative vertical position of bar 26, with respect to the sides, an in or out movement of handle 11 will be accompanied by a corresponding in or out movement of frame 18.

In and out movement of frame 18 is translated into a corresponding side to side movement of writing members 12 and 13 by the provision of a pair of horizontal depthwise extending rails 46 and 47 carried by the subframe 18 and which engage through bearing members 41 and 42 affixed to the lower rails 43 and 44 of the subframes 19 and 20. When the handle 11 is moved in a horizontal direction, the subframes 19 and 20 travel along with it by reason of the engagement of rail members 46 and 47 with the bearing members 41 and 42 and accordingly the vertical wires 23 and 24 will move the writing members 12 and 13 engaged thereby jointly with the handle 11.

The aforementioned translation of the depthwise component of movement of handle 11 into a relative approach and separation of the writing members 12 and 13 is here attained by positioning the rail members 46 and 47 in angular or tapered relation relative to each other in a horizontal plane extending depthwise of the subframe 18. The members 46 and 47 are spaced apart their maximum distance at their ends adjacent to the handle 11 and converge therefrom toward the opposite end 140 of the subframe 18. The bearing members 41 and 42 attached to the subframes 19 and 20 slidably embrace the rails 46 and 47, whereby a pushing of the handle 11 toward and away from the plane of the drawing surfaces 14 and 16 will slide the members 46 and 47 through the bearing members 41 and 42 to cause a relative separation and approach respectively of the vertical wires 23 and 24 and thus effect a proportional horizontal movement of the writing members relative to each other and to their respective drawings, in accordance with the depthwise movements of the handle 11.

As an important feature of the present invention, and as may best be seen in Figure 3 of the drawings, means is provided for starting and stopping the marking action on drawing surfaces 14 and 16 by the writing instruments 12 and 13 as desired by the artist while he is manipulating the handle 11. In the apparatus as here illustrated, the writing members 12 and 13 each consists of a housing 51 having pairs of right angularly arranged, mutually perpendicular, diametric openings 52 for receiving the cross wires 22, 23 and 24 for accurately locating the housings 51 at the intersections of the wires. Antifriction rollers 53 may be carried by the housing in engagement with the wires for obtaining a free, gliding action of the writing members along the wires at their shifting intersections. A suitable drawing instrument 63, which may comprise a pencil, pen, ball point pen, felt point pen, brush, or any other suitable instrument affording the character of lines desired, is carried by the housing 51 and extends therefrom for engagement of the writing point 64 of the instrument with the drawing surface. Starting and stopping of the writing action is here obtained by reciprocating the member 63 to and from the writing surface and such reciprocation may be conveniently obtained by a solenoid actuator 66 mounted within the housing 51 and having a plunger 67 engaged with the drawing instrument 63, whereby energizing of the solenoid will urge the drawing point 64 against the drawing surface while movement of the drawing point 64 away from the drawing surface, upon deenergizing of the solenoid, is effected by a spring 68 compressed between a shoulder 69 formed on the housing and a collar 71 provided on the drawing instrument 63. Energizing of the solenoid to effect engagement of the drawing points with the drawing surfaces is effected through a manual control switch 72 connected in series with the solenoid to a suitable source of electrical current (not shown) and mounted on the apparatus for convenient operation by the artist. Preferably the switch 72 is provided in the form of a thumb switch mounted on the handle 11 in position for convenient actuation by the artist as he holds and manipulates the handle.

Figure 5:
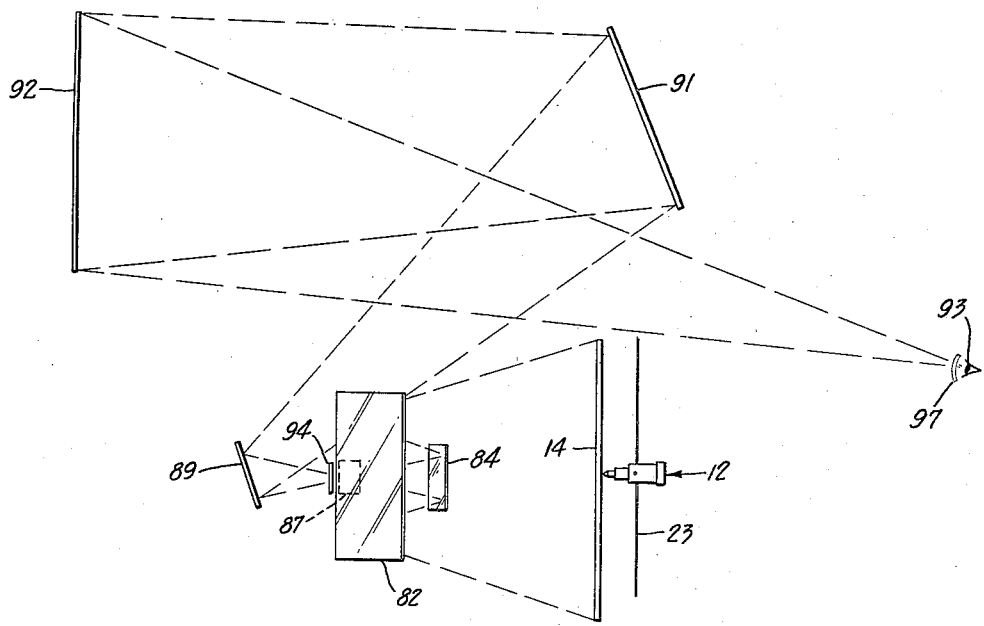
Figure 5 is a side elevational view of the optical system of Figure 4.

As a further important feature of the present invention, means is included in the apparatus for providing stereoscopic viewing of the drawing surfaces by the user during the course of movement of the member 11 and writing members 12 and 13 so as to aid the user in visualizing the spacial relationships and form of his composition. Such means in the present apparatus includes an optical system as illustrated in Figures 4 and 5, having a pair of mirrors 82 and 83 which reflect the images created on the drawing surfaces 14 and 16, from the reverse sides thereof, onto mirrors 84 and 86 which, in turn, direct the images through lenses 87 and 88 onto a mirror 89 which functions to throw the images up out of the general confines of the apparatus and onto a mirror 91 (see Figure 5) from whence the images are cast upon a viewing screen 92 positioned for convenient observation by the user as indicated by the eye 93 in Figure 5. Desirably, the optical system places the images on the screen 92 in enlarged condition and in overlapping relation and to separate the images for stereoscopic viewing I may insert light polarizing filters 94 and 96 in the course of travel of the light, preferably ahead of lenses 87 and 88. In such an arrangement, the artist will view the screen 92 through a suitable pair of polarized spectacles 97 as understood in the art. Any suitable means may, of course, be used for obtaining stereoscopic vision of the images. It is advantageous that the artist be given a view of only the lines being made on the drawing surfaces and of only the points of the writing instruments so that he may mentally coincide these lines and points without visual distraction from the working parts of the apparatus. This is here effected by making the drawing surfaces of translucent material, such as plastic, frosted glass, or the like, and giving the artist a view of the reverse sides of these drawing surfaces as illustrated in the optical system shown in Figures 4 and 5. As an aid in carrying out this arrangement, suitable light sources 101 are positioned for casting strong, shadowless illumination upon the points of the drawing members 12 and 13.

As a further aid in readily locating the points of the drawing instruments in the drawings and also as a visual indication of the apparent depth of the fused points within the drawing, threadlike elements 111 and 112 may be attached as here shown to and extend between the fixed support 113, mounted on the main frame 21, and the writing members 12 and 13. These threads may be conveniently of elastic material and arranged to cast their shadows upon the drawing surfaces 14 and 16 to provide lines of sight leading to the writing members. I prefer to locate the fixed points of support 116 and 117 of the threads adjacent the upper or lower edges of the drawing surfaces 14 and 16 so that these threads will have a vertical component of length leading to the writing members. In such an arrangement, the threads will be most nearly parallel when the handle 11 is pulled as far as it will go toward the artist and the writing members are at their nearest approach. As the handle is pushed away from the artist, and the writing members separated, the shadows of the threads thrown upon the drawing surfaces will become inclined relative to each other (diverging toward the writing members) and, when stereoscopically viewed, will indicate the apparent depth of the drawing point within the picture being drawn.

In the operation of the present apparatus, the artist grasps the handle 11 and moves it freely through a course of movement in all directions required to draw out a three dimensional object or scene. As the handle is moved, the artist may look at the image of the drawing surfaces 14 and 16 projected in the screen 92 to achieve a stereoscopic view of the drawing and, with the use of thumb switch 72, he may retain full control over the starting and stopping of the lines so as to fill in his pictures as desired.

I claim:

1. An apparatus for making stereoscopic drawings comprising: a pair of writing members mounted for movement over drawing surfaces to denote horizontal and vertical dimensions thereon; a manually engageable part mounted for three-dimensional horizontal and vertical depthwise movement; and motion transmitting means connecting said part and said writing members and transmitting the horizontal component of movement of said part into joint horizontal movement of said writing members and providing a constant correlative movement between said part and members at all depthwise positions of said part, and transmitting the vertical component of movement of said part into joint vertical movement of said writing members and providing a constant correlative vertical movement between said part and member at all depthwise positions of said part, and transmitting the depthwise component of movement of said part into relative horizontal movement of said members with said writing members separating from each other with increased depthwise movement of said part and providing a constant increment of relative horizontal movement of said writing members for each increment of depthwise movement of said part at all depthwise positions of said part.

2. An apparatus for making stereoscopic drawings comprising, a first straight elongated member mounted for movement transversely of its length, second and third straight elongated members mounted in perpendicular relation to said first member in a common plane to provide points of intersection with said first member, said second and third members being mounted for movement transversely of their length parallel to said first member, slides jointly carried by said members at said points of intersection so as to travel with and be located at said points, writing members carried by said slides for marking the movement of said points of intersection on a drawing plane parallel to said first mentioned plane, a manually engageable part mounted for three-dimensional horizontal and vertical and depthwise spatial movement, and means connecting said parts to said members and transmitting and translating the horizontal and vertical and depthwise components of movement of said part into joint movement of said second and third members and movement of said first member and relative movement of said second and third members respectively.

3. An apparatus for making stereoscopic drawings comprising, a first straight elongated member mounted for movement transversely of its length, second and third straight elongated members mounted in perpendicular relation to said first member in a common plane to provide points of intersection with said first member, said second and third members being mounted for movement transversely of their length parallel to said first member, slides jointly carried by said members at said points of intersection so as to travel with and be located at said points, writing members carried by said slides for marking the movement of said points of intersection on a drawing plane parallel to said first mentioned plane, a manually engageable part mounted for three-dimensional horizontal and vertical and depthwise spatial movement, means connecting said parts to said members and transmitting and translating the horizontal and vertical and depthwise components of movement of said part into joint movement of said second and third members and movement of said first member and relative movement of said second and third members respectively, and manually operable means carried by said part for starting and stopping the marking action of said writing members on said drawing plane.

4. An apparatus for making stereoscopic drawings comprising, a first straight elongated member mounted for movement transversely of its length, second and third straight elongated members mounted in perpendicular relation to said first member in a common plane to provide points of intersection with said first member, said second and third members being mounted for movement transversely of their length parallel to said first member, slides jointly carried by said members at said points of intersection so as to travel with and be located at said points, light transmitting drawing surfaces mounted in a plane parallel to said first plane, writing members carried by said slides for marking the movement of said points of intersection on one side of said drawing surfaces, a manually engageable part mounted for three-dimensional horizontal and vertical and depthwise spatial movement, means connecting said parts to said members and transmitting and translating the horizontal and vertical and depthwise components of movement of said part into joint movement of said second and third members and movement of said first member and relative movement of said second and third members respectively, and means projecting the images of the markings of said writing members from the reverse sides of said drawing surfaces onto a screen for stereoscopic viewing by the user whereby only such markings will be seen.

5. An apparatus for making stereoscopic drawings as characterized in claim 3 wherein said drawing plane is composed of a light transmitting sheet for the rendering of said drawings on one side of said sheet, and including means providing stereoscopic viewing of the other side of said sheet by the user whereby only said drawings will be seen.

6. An apparatus for making stereoscopic drawings comprising, a pair of writing members mounted for movement over a pair of drawing surfaces to denote horizontal and vertical dimensions thereon, a manually engageable part mounted for three-dimensional horizontal and vertical and depthwise movement, and means connecting said part and said writing members and effecting: (a) at all depthwise positions of said part joint horizontal and vertical displacement of said writing members in direct lineal proportion to the horizontal and vertical components of movement respectively of said part, and (b) at all horizontal and vertical positions of said part a change in horizontal spacing between said writing members in direct lineal proportion to the depthwise component of movement of said first member.

7. An apparatus for making stereoscopic drawings comprising, a pair of drawing surfaces, a pair of writing members mounted for movement over and having points for marking upon said drawing surfaces, a manually engageable part mounted for three-dimensional horizontal and vertical and depthwise movement, means connecting said part and said writing members and effecting: (a) at all depthwise positions of said part joint horizontal and vertical displacement of said writing members in direct lineal proportion to the horizontal and vertical components of movement respectively of said part, and (b) at all horizontal and vertical positions of said part a change in horizontal spacing between said writing members in direct lineal proportion to the depthwise component of movement of said first member, means providing stereoscopic viewing of said drawing surfaces and said points during the making of said drawings, and a thread-like element having one end mounted at a fixed point of reference at an edge of one of said drawing surfaces and extending and being secured to one of said points for movement therewith in the drawing plane to provide the viewer with a depth of field reference during the making of said drawings.

8. An apparatus for making stereoscopic drawings as characterized in claim 7 wherein a pair of said thread-like elements are mounted on said drawing surfaces at the same picture points and extend therefrom and being connected to said points so as to lie substantially in the picture plane for stereoscopic viewing to provide the viewer with a depth of field of reference during the making of said drawings.

References Cited in the file of this patent

UNITED STATES PATENTS

| | | |
|---|---|---|
| 1,131,451 | Williams | Mar. 9, 1915 |
| 1,138,347 | Bauersfeld | May 4, 1915 |
| 1,503,733 | Warmoth | Aug. 5, 1924 |
| 2,171,894 | Rule | Sept. 5, 1939 |
| 2,674,156 | Mahler | Apr. 6, 1954 |

FOREIGN PATENTS

| | | |
|---|---|---|
| 655,228 | Great Britain | July 11, 1951 |